(12) United States Patent
Ledet

(10) Patent No.: US 10,701,079 B1
(45) Date of Patent: Jun. 30, 2020

(54) COLLABORATIVE DATA SHARING AND CO-BROWSING WITH NATURAL LANGUAGE MASKING

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 227 days.

(21) Appl. No.: 15/380,817

(22) Filed: Dec. 15, 2016

(51) Int. Cl.
  *H04L 29/06* (2006.01)
  *H04L 12/18* (2006.01)
  *H04L 29/08* (2006.01)

(52) U.S. Cl.
  CPC ........ *H04L 63/102* (2013.01); *H04L 12/1813* (2013.01); *H04L 65/4015* (2013.01); *H04L 67/306* (2013.01)

(58) Field of Classification Search
  CPC ............... H04L 63/102; H04L 12/1813; H04L 65/4015; H04L 67/306
  See application file for complete search history.

(56) References Cited

U.S. PATENT DOCUMENTS

| | | | |
|---|---|---|---|
| 4,945,563 A | 7/1990 | Horton et al. | |
| 6,278,836 B1 | 8/2001 | Kawara et al. | |
| 6,678,822 B1 | 1/2004 | Morar et al. | |
| 2008/0168135 A1 | 7/2008 | Redlich et al. | |
| 2009/0147958 A1 | 6/2009 | Calcaterra et al. | |
| 2009/0323087 A1 | 12/2009 | Luo | |
| 2011/0145593 A1 | 6/2011 | Auradkar et al. | |
| 2013/0290494 A1 | 10/2013 | Goudarzi et al. | |
| 2014/0013452 A1* | 1/2014 | Aissi | G06F 21/604 726/30 |
| 2014/0282135 A1 | 9/2014 | Segre | |
| 2014/0282872 A1 | 9/2014 | Hansen et al. | |
| 2015/0106883 A1 | 4/2015 | Miller et al. | |
| 2015/0246989 A1 | 9/2015 | Bell et al. | |
| 2015/0271206 A1 | 9/2015 | Schultz et al. | |
| 2016/0034713 A1 | 2/2016 | Ramirez | |
| 2016/0246989 A1 | 8/2016 | Roy et al. | |
| 2016/0379010 A1* | 12/2016 | Farkash | G06F 21/6245 726/1 |
| 2017/0048275 A1 | 2/2017 | John et al. | |
| 2017/0132186 A1 | 5/2017 | Plummer | |
| 2017/0323119 A1* | 11/2017 | Harp | G06F 3/065 |

\* cited by examiner

*Primary Examiner* — Jeffrey C Pwu
*Assistant Examiner* — Thong P Truong

(57) ABSTRACT

Customized data management may include an example method which provides identifying data being accessed by at least one user device, retrieving a user profile associated with the user device, identifying access rights associated with the user profile, modifying the data by obscuring at least a portion of the data based on the access rights of the user profile.

20 Claims, 18 Drawing Sheets

FIG. 6

COLLABORATIVE DATA SHARING AND CO-BROWSING WITH NATURAL LANGUAGE MASKING

TECHNICAL FIELD OF THE APPLICATION

This application relates to collaborative data sharing among piers and more particularly to data sharing and data updating among various users working together on a common project or work effort.

BACKGROUND OF THE APPLICATION

Conventional user access and network based collaboration on work related projects provide access, security updates and other features to the enterprise environment. One conventional application is offered by LIVELOOK as a provider of cloud-based, real-time visual collaboration with technology for co-browsing and screen sharing that optimizes customer interactions. For example, LIVELOOK's co-browsing technology enables customer service and sales agents to collaborate and visually guide consumers through web and mobile environments to resolve issues effectively and improve quality of buying decisions.

The ORACLE 'Service Cloud' and LIVELOOK empowers modern customer service organizations to directly engage with customers, bolstering customer satisfaction, agent efficiency, and revenue growth across web and mobile channels. The 'Service Cloud' is an integral part of the 'Customer Experience Cloud', which includes commerce, sales, service, social and marketing clouds, and enables a seamless and integrated customer experience. However, such approaches to customer support and integrated collaboration tools are limited in scope and do not offer a fully customized approach to user collaboration and engagement efforts.

Co-browsing among multiple users may require instances of viewing and/or hiding information. There are many types of data, i.e. text, images, videos, photos, multimedia files, URLs/links, etc. and many types of access levels, the ability to review incoming data and mask the data on-the-fly utilizing natural language processing may offer users an optimal co-browsing experience.

SUMMARY OF THE APPLICATION

One example embodiment may provide a method that includes at least one of identifying data being accessed by at least one user device, retrieving a user profile associated with the user device, identifying access rights associated with the user profile, modifying the data by obscuring at least a portion of the data based on the access rights of the user profile.

Another example embodiment may include an apparatus that includes a processor configured to identify data being accessed by at least one user device, retrieve a user profile associated with the user device, identify access rights associated with the user profile, and modify the data by obscuring at least a portion of the data based on the access rights of the user profile.

Yet another example embodiment may include a non-transitory computer readable storage medium configured to store instructions that when executed cause a processor to perform identifying data being accessed by at least one user device, retrieving a user profile associated with the user device, identifying access rights associated with the user profile, and modifying the data by obscuring at least a portion of the data based on the access rights of the user profile.

Still another example embodiment may include a method that includes identifying a user profile associated with a user device, identifying a modification to at least one previous access right associated with the user profile, modifying at least one visually obscured portion of a document based on the modification to the at least one previous access right to create an updated document, and providing the updated document to the user device.

Still yet another example embodiment may include an apparatus that includes a processor configured to identify a user profile associated with a user device, identify a modification to at least one previous access right associated with the user profile, modify at least one visually obscured portion of a document based on the modification to the at least one previous access right to create an updated document, and provide the updated document to the user device.

Still another example embodiment may include a non-transitory computer readable storage medium configured to store instructions that when executed causes a processor to perform identifying a user profile associated with a user device, identifying a modification to at least one previous access right associated with the user profile, modifying at least one visually obscured portion of a document based on the modification to the at least one previous access right to create an updated document, and providing the updated document to the user device.

BRIEF DESCRIPTION OF THE DRAWINGS

FIG. 6 illustrates an example user interface with a hidden data portion according to an example embodiment of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
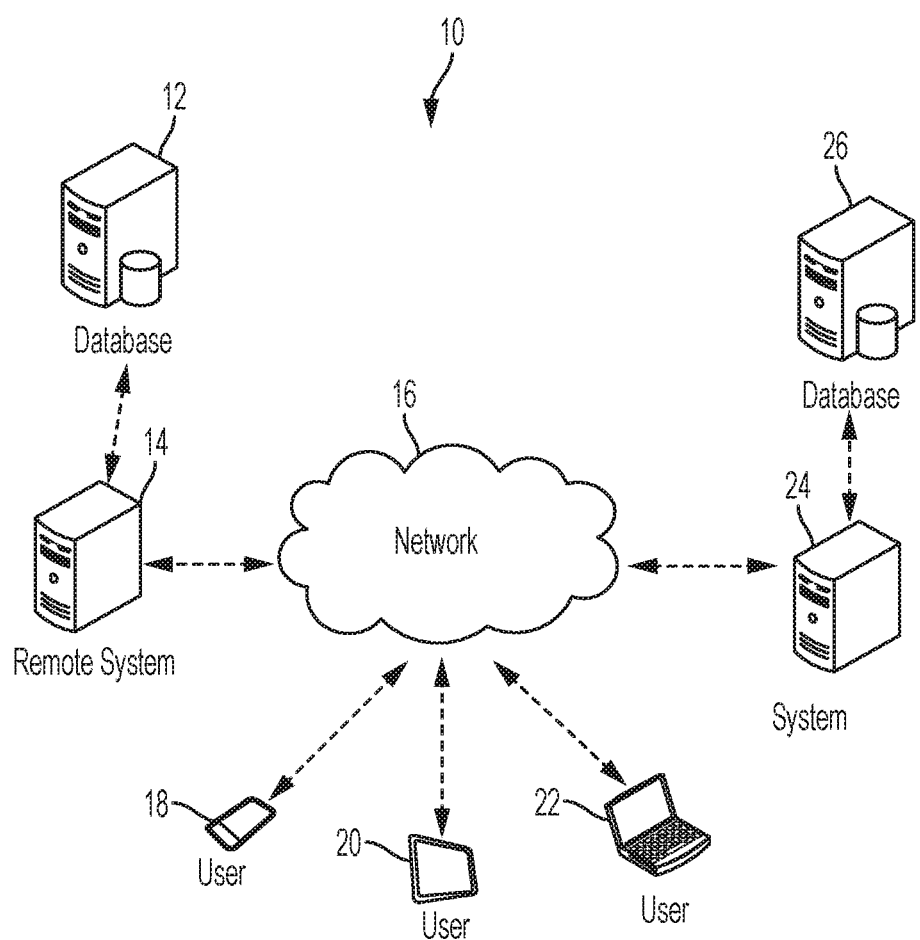
FIG. 1 illustrates a system diagram according to an example embodiment of the present application.

FIG. 1 illustrates a system network diagram according to an example embodiment of the present application. Referring to FIG. 1, the network diagram 10 of the present application may permit a user utilizing a mobile client machine 18, a tablet computer 20, a laptop or desktop computer 22 to download data and application data from the system server 24 over the network 16. The client's device may also be a gaming device, a DVD player, or any other device that is normally used to access media.

The computing device 18/20/22 is connected to the network 16, which may be the Internet or any other type of communication network through wired or wireless communication. It should be noted that other types of devices, in addition to devices 18/20/22, might be used with the example embodiments of the present application. For example, a PDA device, an MP3 player device and/or any other wireless device including a gaming device, such as a hand-held device or home-based device and the like including a P.C. or other wired device that can also transmit and receive information could be used with the embodiments of the present application.

The user of the application can interface with the client device 18/20/22 and connect through the network 16 to the system server 24. The system server 24 can be redundant or may be more than a single entity without deviating from the scope of the application. A database or database server 26 may be directly connected to the system 24 or connected remotely through the network 16 without deviating from the scope of the application.

In operation, a remote system server 14 communicates with the network 16. The remote system 14 can be redundant and/or may be more than a single entity device without deviating from the scope of the application. A database 12 is directly connected to the remote system server 14 or may be connected remotely through the network 16 without deviating from the scope of the application. The user-database can reside in the system server 24 or the database 26 either directly connected to the system 24 or remotely through the network 16.

The application of the current application resides completely or partially on the user's device 18/20/22, which can be a mobile device, but can also reside on a user's desktop computer, a personal digital assistant (PDA), tablet computer, a smart watch or smart eyeglass worn on the body of the user or any other device containing a processor, memory, and an operating system. In addition, the software application of the current application can reside on either completely or partially on any one of the other elements in the system 10 depicted in FIG. 1, for example, the system server 24, the database server 26, the remote system server 14, the database server 12, and/or the network 16. If the software application of the current application resides on a device, the application may be downloaded through a platform, such as an application store or virtual market residing on the device or accessed via the device, or may be accessed through the device's browser communicably coupled to the network 16. Further, the application of the current application can be pre-loaded on the device.

There are many types of data that can be shared, i.e. text, images, videos, photos, multimedia files, URLs/links, etc. The current application discloses examples of sharing modified data or data to be modified. Screen sharing between two or more computing devices has various practical applications. For example, screen sharing enables remote technical support in a robust and economical manner. Another practical use is collaboration between a host and a viewer so the host may share a presentation to one or more remote viewers, perform demonstrations, review documents, and share images. Such applications are useful in remote classroom scenarios such that a presentation may be performed when the student is remotely located from the teacher.

In one specific example of data collaboration, multiple individuals may be working on a project via their remotely disposed computing devices communicating over a network. The project may have multiple levels of access associated with particular aspects of the project to permit compartmentalization of data to protect trade secrets within the project. One example may permit the compartmentalization 'whiting out', redacting or camouflaging portions of the data file based on access level permitted to those user profiles and user devices accessing such data. The current application operating on a user device may operate with any device, such as a personal computer, a laptop, a personal computing tablet, a smartphone, a PDA, a watch, electronic glasses or any device with a processor and memory.

One example of the current application permits data that resides in a shared co-browsing environment to be restricted per individual, group, management level, etc., based on an access level accorded either by the system or a coordinator. Example embodiments may expand functionality of the present application and may offer examples depicting the functionality of the application. The examples serve to describe the overall functionality of the application.

Figure 2:
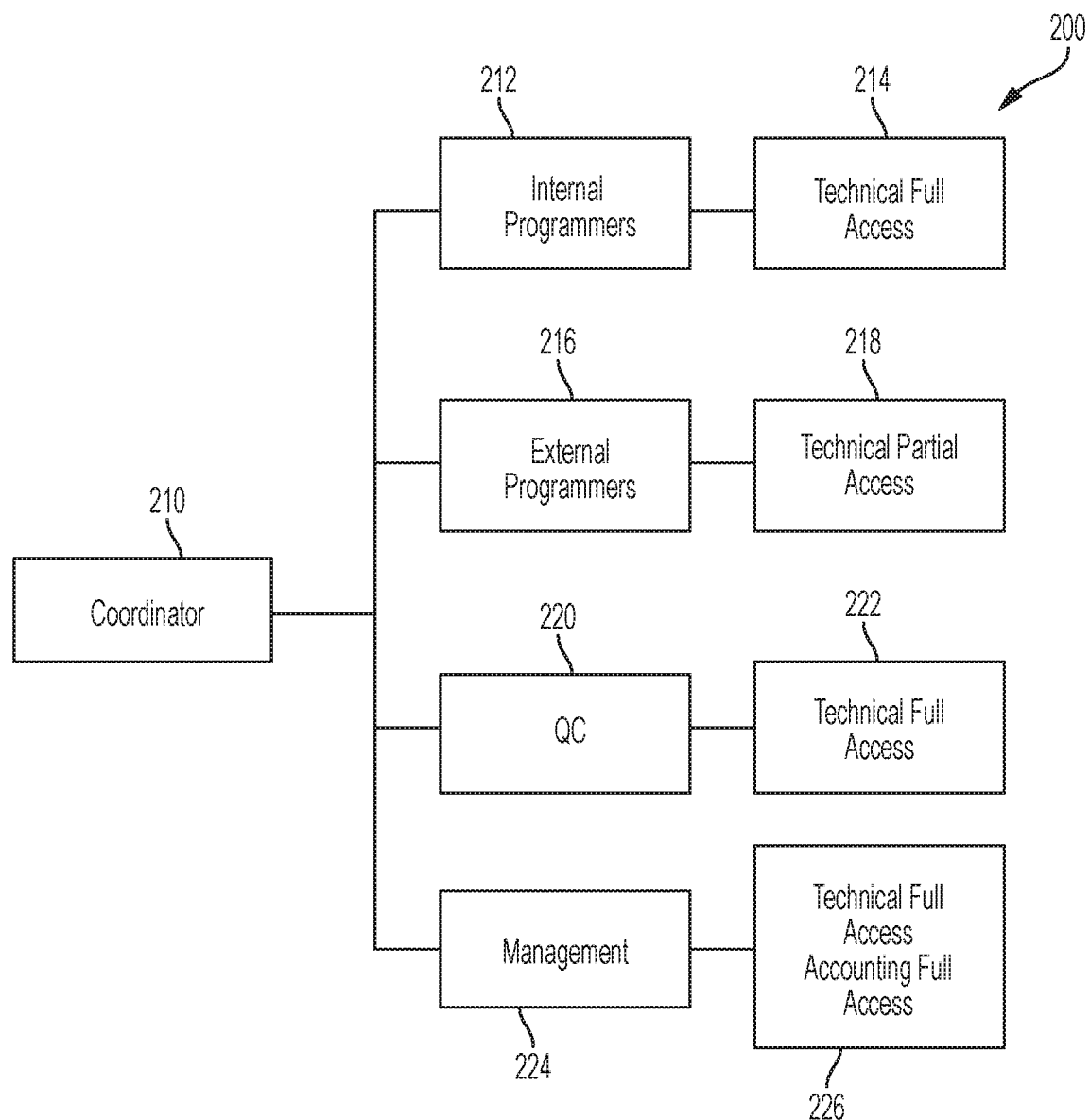
FIG. 2 illustrates a group level access diagram according to an example embodiment of the present application.

FIG. 2 illustrates an example of group level access, where the granularity of the access is based on group status. In this example, diagram 200 includes the coordinator 210 setting access levels of the internal programmer employees 212 to full technical access 214. A group of external employees 216 are permitted to have partial technical access 218. Quality control (QC) 220 is permitted to have full technical access 222 and the management team 224 is permitted to have both full technical access and full accounting access of data within the project 226. This implies that there may be various documents and portions of documents which are accessible to those having the proper access levels. In one example, one access level may include certain documents and another access level may include additional documents or portions thereof.

Figure 3:
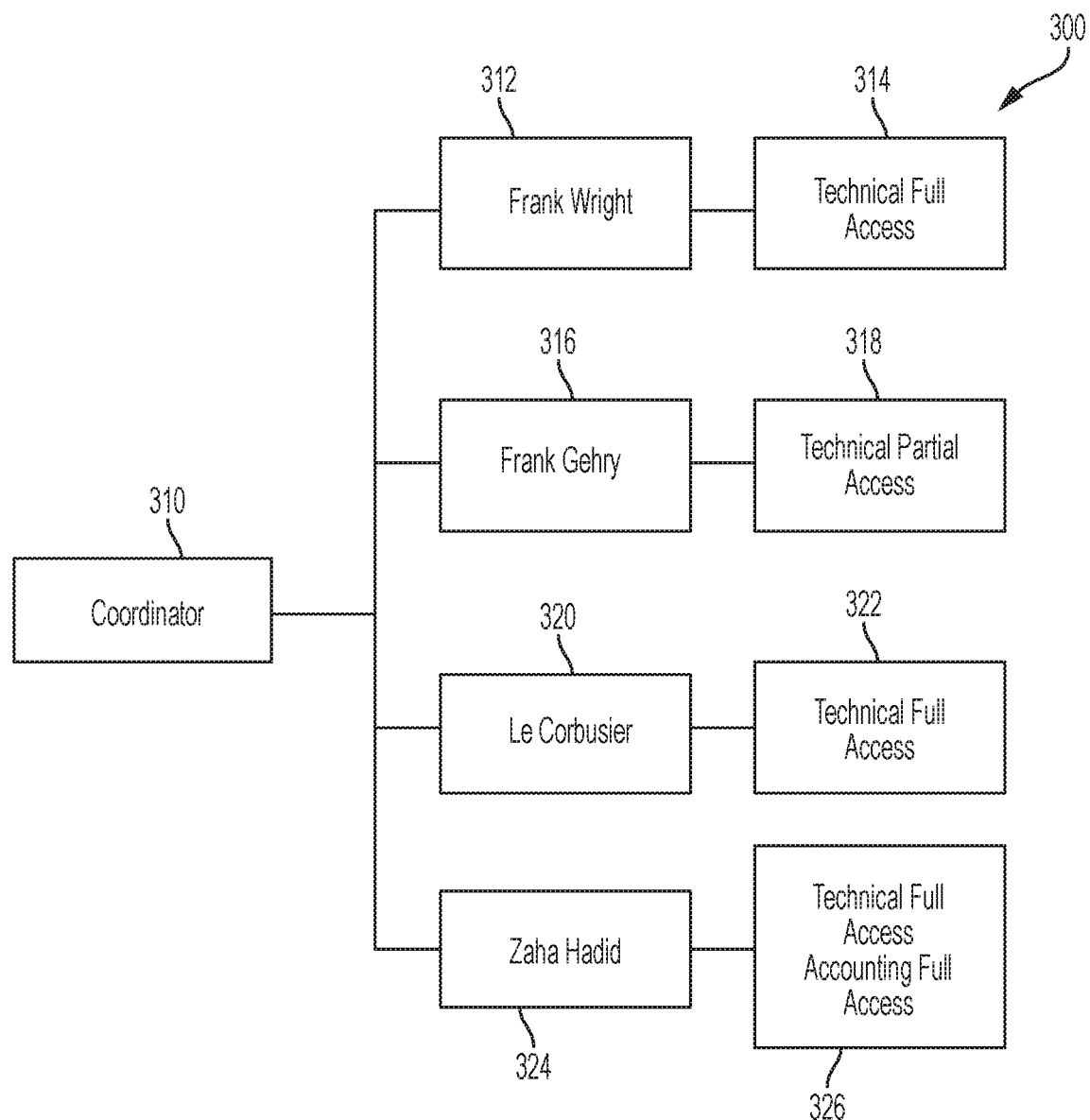
FIG. 3 illustrates a personal level access diagram according to an example embodiment of the present application.

FIG. 3 illustrates logic diagram example 300 of a personal level access allocated by a coordinator 310 where individual contributors 312, 316, 320 and 324 are permitted either full 314/322 or partial 318 technical and/or accounting access 326.

Figure 4:
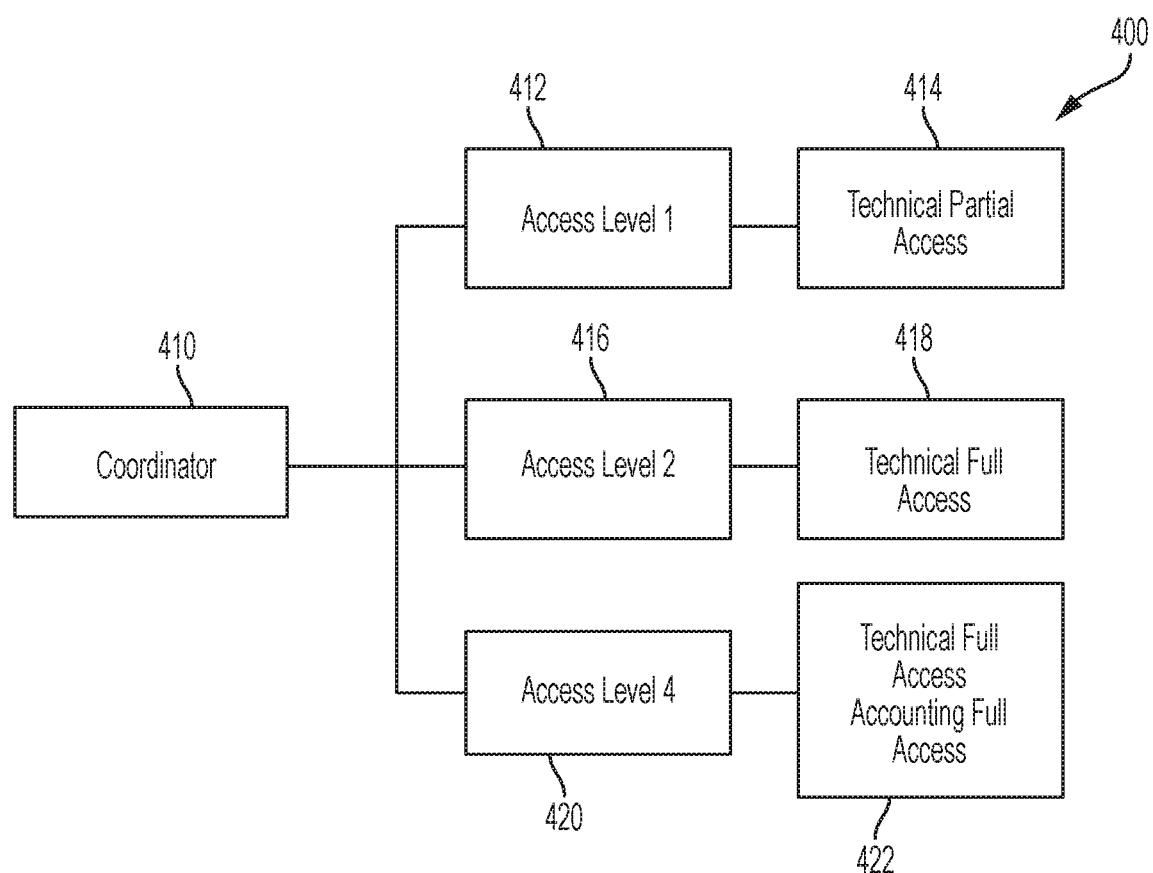
FIG. 4 illustrates a coordinator based access level diagram according to an example embodiment of the present application.
Figure 5:
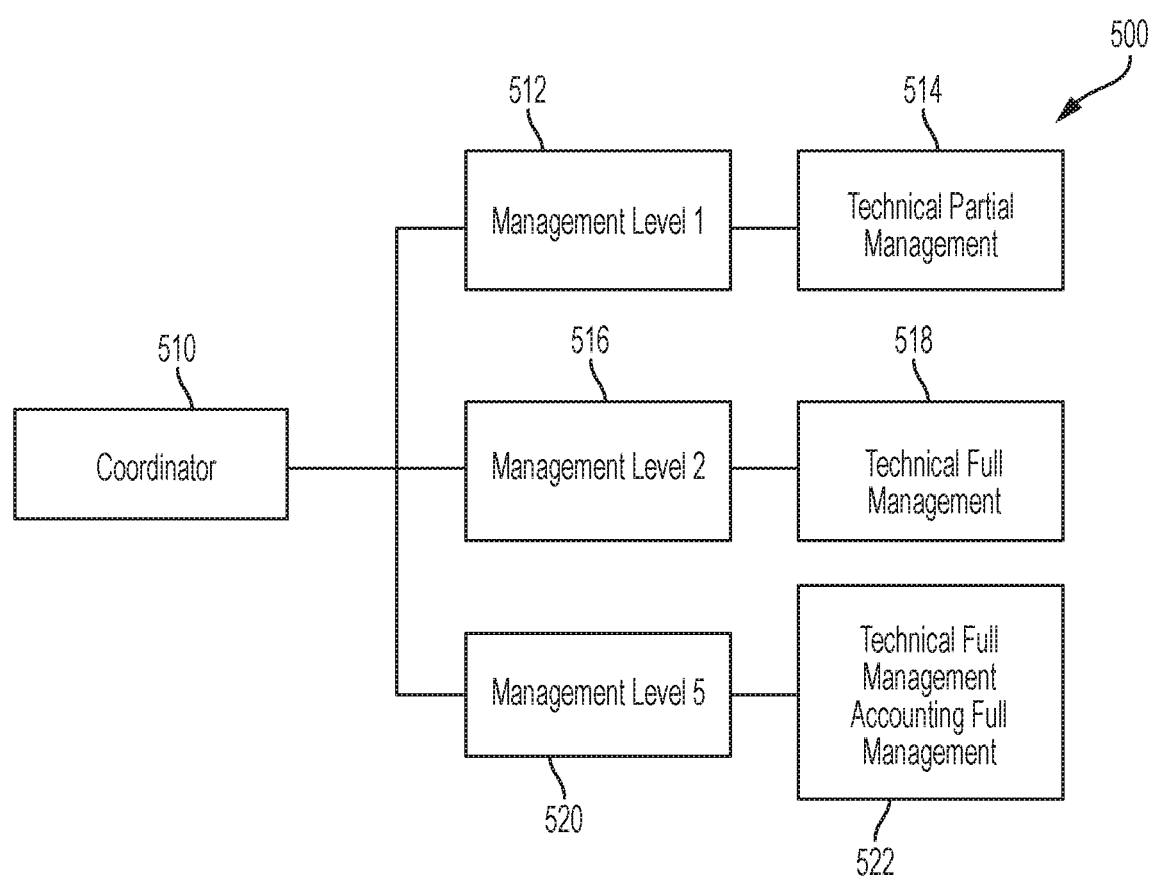
FIG. 5 illustrates a coordinator based management access level diagram according to an example embodiment of the present application.

FIG. 4 illustrates another example logic diagram 400 with a coordinator 410 setting access levels, such as 'level 1' 412 to have partial technical access 414, 'level 2' 416 having full technical access 418, and access 'level 3' 420 having both full technical access and full accounting access 422. Yet another example is illustrated in FIG. 5 which includes an example 500 of a coordinator 510 setting management level access levels 1, 512 having partial technical access 514, level 2, 516 having full technical access 518 and level 3, 520, having both full technical access and full accounting access 522. The determined access level may apply to any type of visual data such as words, images, video content and similar types of data. The determined access level may also apply to categories of data or data containing specific keywords, triggers, etc.

Co-browsing environment criticality may be decided based on financial aspects of the project, intellectual property of portions of the project, uniqueness of portions of the project and the like. The criticality determinations may be made either by the system automatically via headings, content of the information and/or via a coordinator. The criticality of content that is presented on various user interface screens of the co-browsing environment may be accomplished by natural language modules located either on the local device, web server, cloud, remoter servers or other sources of information. If a natural language module is utilized, calculations and actions may be completely hidden from the individual user devices.

In one example, the data may be marked as 'public access' with certain parts as 'private access' and other parts as 'restricted access'. The determined criticality and the display may work in tandem with the access level associated with a participant in the session. The co-browsing data may be hidden from either participants or software agents. The act of hiding/obscuring or masking data may incorporate two elements including visually obscuring a portion of the data in question and obscuring the data beneath the visual element.

In the case of visual obscuration, several obscuring operations may be used, such as whiting-out, redaction and/or camouflaging. Whiting-out and redaction are straightforward and only cover over the portion in question with either a white band or a black band or a block of empty content overlaid onto the content to be obscured. Optical camouflaging may be more complex and may include whiting-out the portion in question and overlaying a sample of data that would be accessible to the lowest access level and that appears to fit within the space that is meant to be hidden. Optical and/or data obscuring may be performed at the central system server 24. The application performing the below functionality may exist entirely or in part in the client device 18/20/22, the system 24, the database 26, the remote system 14, and/or the remote database 12.

A first example method of visual obscuration may include selecting regions of text which are to be redacted and marking those within a document, the marked document is redacted so the marked-text is replaced once the markings are complete, and then the marked document portion is converted to an image and inserted at the point of redaction, thus replacing the redacted text with a redacted image portion.

A second example method of visual obscuration may include highlighting a section having black text with a black highlighter and subsequently converting the visually obscured portion to an image placed within the document to replace the redacted text. A third example method of visual obscuration includes using a paint brush point to paint over the text to be hidden using a pixel painting program and subsequently converting the marked area into an image, converting the visually obscured portion to an image placed within the document to replace the obscured text.

Another example method of data obscuration may include encrypting the underlying data by replacing a section of text with an encrypted portion. The data encryption would be performed at the host server for those without the necessary access level to review the co-browsing data. The encrypted data would be reinserted into the document and could only be unlocked with a decryption key given to those having sufficient authorization.

An example of obscuring a portion of a photo may include receiving a source image, identifying a target image having a target area to be removed from the source image, identifying a set of coordinates of the target area and forming a digital image based on image data information of the target image. The image data information of the target area is then replaced with image data of the source area.

One example of obscuring a portion of a video may comprise receiving at least one frame of data representing a source image, identifying a target image having a target area to be removed from the source image, differentiating the background elements and the target image area, replacing the target image area with an alternate background replacement area based on the source image and displaying only a modified source image so the alternate background replacement area replaced the target image area to form a new image.

One example of obscuring a portion of a video may include receiving at least one frame of data representing a source image, such as the view of an antenna installation in a forest. If the design of one of the antennas is a trade secret, but is present in a photo within the video, this target is identified as being of a different color, texture and shape than the forest background, in this way an identification of the target image (antenna) having a target area to be removed can be identified from the source image (forest). The color and texture of the antenna and the forest background in this example provide differentiation for the background elements and the target image. The antenna may be outlined as a possible target for removal, and the target image is replaced with an alternate background replacement area (i.e., other trees from the forest background) based on the source image (forest). Also, by displaying only a modified source image, the alternate background replacement area replaces the target image area to form a new image showing only a waterfall. The target area in the photo will typically include only a portion of the source image and may be identified for replacement as long as there is a color or texture difference between the target and source. The original picture is held in memory and the updated picture utilizes the stored original picture as the source image for both the original portion and the target image replacement portion as an openly shareable image. When the photo has been created, the viewer will be shown the openly shareable image during image access unless the viewer has sufficient access to view the original photo. The photo update and storage are performed at the storage server during an initial storage operation.

Figure 6:
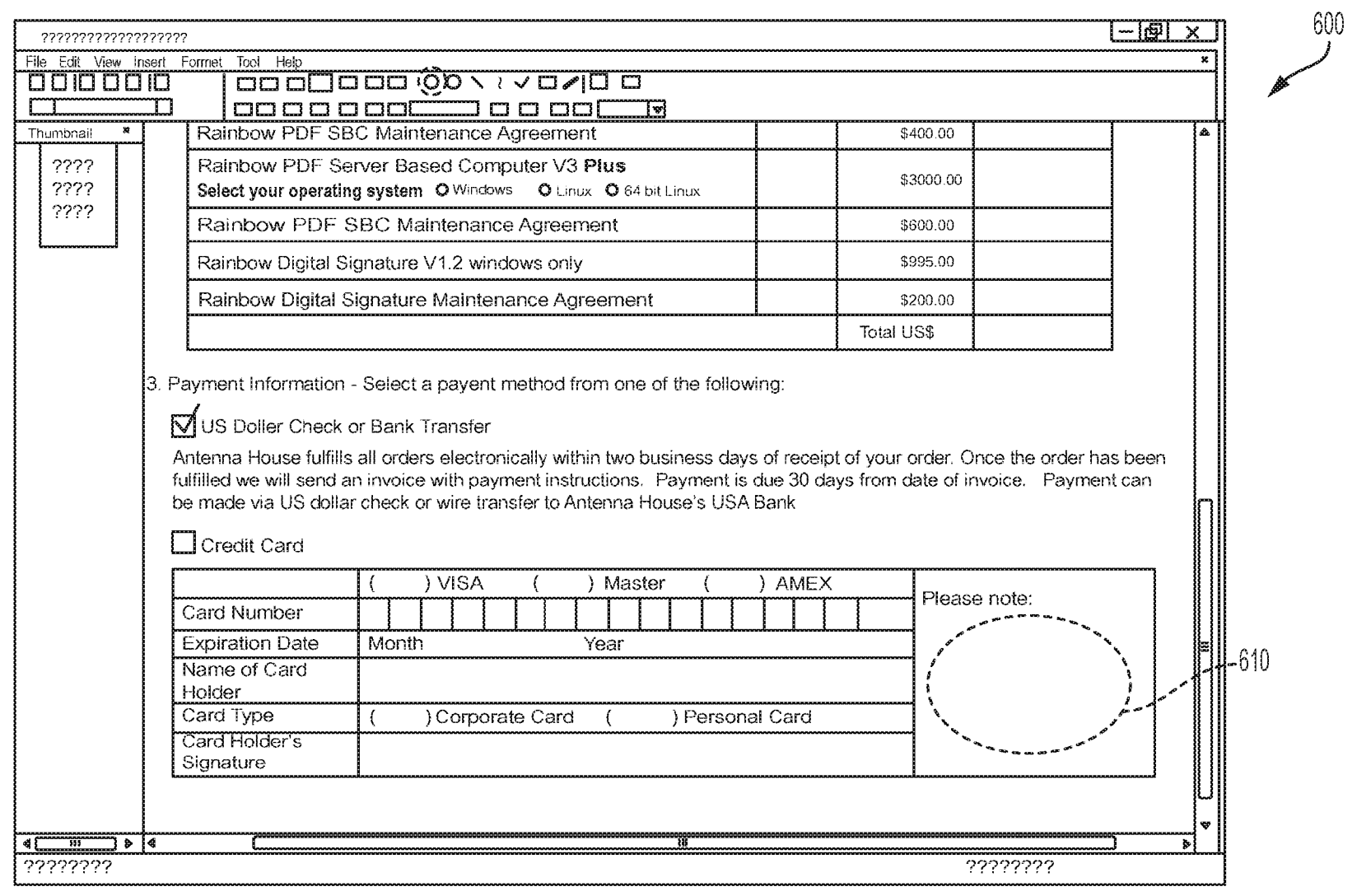

FIG. 6 illustrates an example of hiding co-browsing session data 600 by obscuring 'whiting-out' the delta 610 for those with insufficient access authorization. The portion of the document or environment (i.e., web link) may be modified and obscured contemporaneous with the user profile of the user device being authorized and processed to identify whether the user has the proper rights necessary to view and access the tagged portion of data (i.e., sensitive data).

In this example a technician wanting to know which software has been paid for is given access to a receipt. The receipt shows, in addition to the software purchased, the bank transfer information for the company in portion 610. The technician has full access to determine which software has been legitimately purchased, but does not need access to the company's bank transfer information. The portion of the document or environment (i.e., web link), in this case the bank transfer information in block 610, may be modified and obscured contemporaneous with the user profile of the user device being authorized and processed to identify whether the user has the rights necessary to view and access the tagged portion of data (i.e., sensitive data). The delta between the original receipt and the receipt shown to the technician is the sensitive financial data for the company. In this example, the openly shareable image would be stored in addition to the original, but only the openly shareable image absent a sufficient access level to observe the original including the bank transfer information. The photo update and storage are performed at the storage server during initial storage of the original photo.

Figure 7:
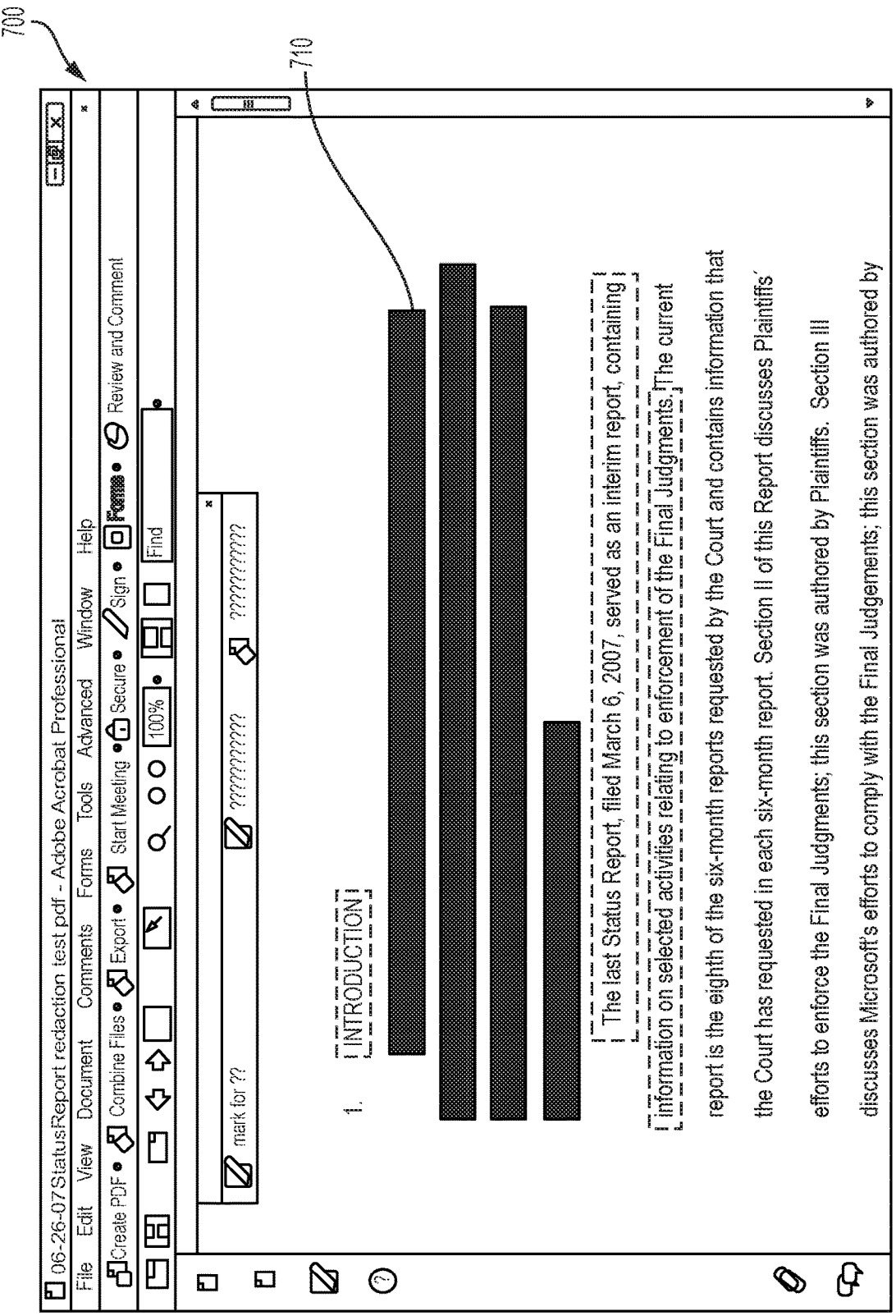
FIG. 7 illustrates another user interface with a hidden data portion according to an example embodiment of the present application.

FIG. 7 illustrates an example user interface performing a hiding of co-browsing data according to example embodiments. Referring to FIG. 7, the interface 700 includes an example document which has had portions redacted by redacting the delta 710 for a user profile and/or device with insufficient access authorization. The user profile associated with the device is retrieved and an authorization file is retrieved from memory via a management server to identify the active rights of that particular user profile. Thereafter, the document is modified to update the deltas with redaction for those portions of tagged data which are labeled as sensitive or which have a higher level of security or rights than those of the current user profile accessing the document.

Figure 8:
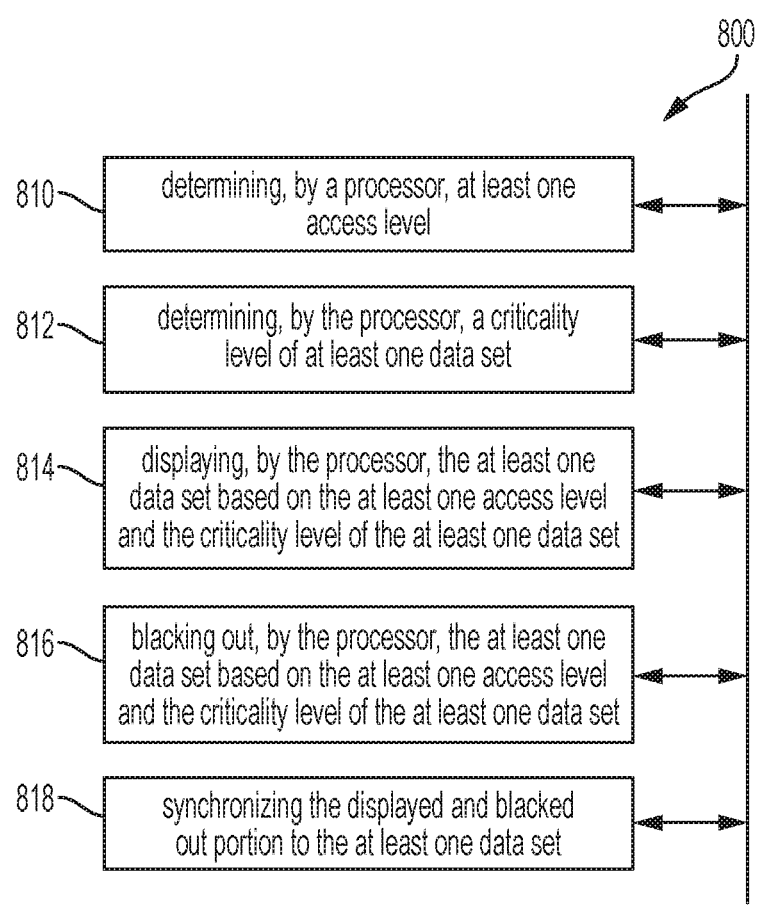
FIG. 8 illustrates a logic flow diagram of performing data masking according to an example embodiment of the present application.

FIG. 8 illustrates a first method of operation 800 for redacting data. The example includes an initial determining operation 810, by a processor, to identify at least one access level of the user profile accessing that data. The processor then performs determining 812, by the processor, a criticality level of at least one data set of the data being accessed and displaying 814, by the processor, the at least one data set based on the at least one access level and the criticality level of the at least one data set. For example, if the criticality level is higher than the access level of the user profile accessing the document, the critical data is promptly identified and the sensitive portions (i.e., the critical portions) are immediately obscured 'blacked-out' 816, by the processor, based on the at least one access level and the criticality level of the at least one data set. The data is then synchronized 818 and displayed or re-displayed with the blacked-out portion. The blacking-out of the portion of text may be performed by redaction, including highlighting or pixelating/painting over the data. This may include identifying the portion of the document by words, images, coordinates on the display area of the page(s), etc.

The blacking-out may be performed based on whether the information is compartmentalized and critical, such as financially critical data, such as a social security number, credit card number, pin, and the like, where the information is captured in a specified number of digits. The tag would start and stop with the digits having the predetermined length either before or after financially critical tag words such as SSN, PIN, VISA, AMEX, and the like.

There may be critical engineering details that are also compartmentalized and critical, in these cases when the text containing the critical engineering detail is encountered, the entire paragraph may be blacked-out. If videos contain critical details as described above, are encountered, then an obscuring of a portion of the video may be performed as detailed above.

In another example, the access rights of various users or the criticality of the document may be modified by the application to permit a change to the access level of a particular user profile. The user profile may achieve a position of responsibility such that the application detects the change in a previous access level and provides to the user profile the data that was previously visually obscured.

Figure 9:
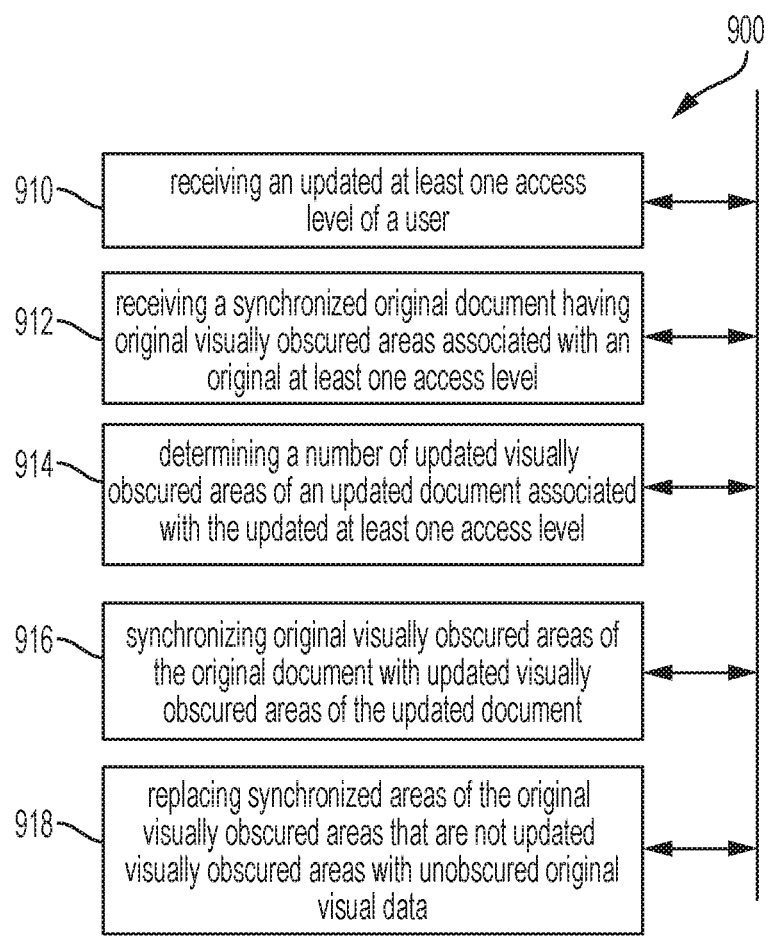
FIG. 9 illustrates a logic flow diagram of performing data unmasking according to an example embodiment of the present application.

FIG. 9 illustrates another example method 900 which includes receiving 910 an updated access level(s) of a user profile and receiving a synchronized original document having original visually obscured areas associated with an original access level 912, determining 914 a number of updated visually obscured areas of an updated document associated with the updated at least one access level, synchronizing 916 original visually obscured areas of the original document with updated visually obscured areas of the updated document and replacing 918 synchronized areas of the original visually obscured areas that are not updated visually obscured areas with unobscured original visual data.

Figure 10:
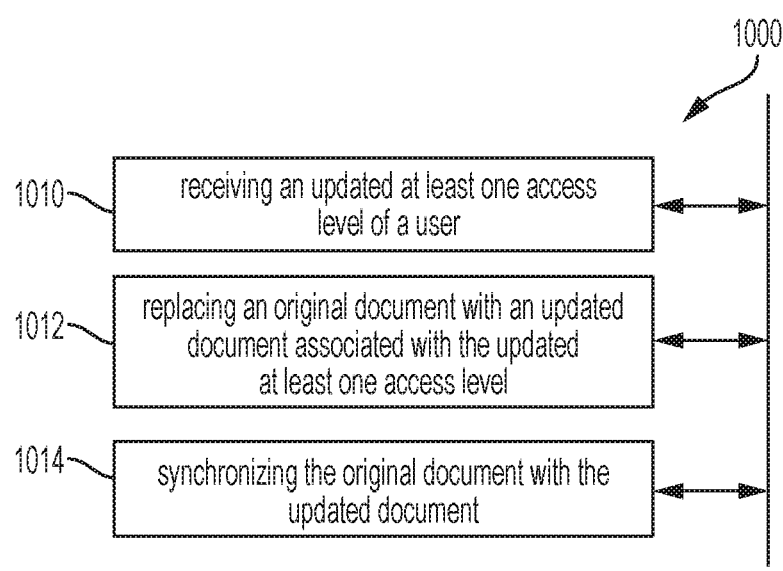
FIG. 10 illustrates a logic flow diagram of updating a user access level of a document according to an example embodiment of the present application.

FIG. 10 illustrates an example of another method 1000 that includes receiving an updated access level 1010 of a user profile, replacing 1012 an original document with an updated document associated with the updated access level and synchronizing 1014 the original document with the updated document. The changes to an access level of a user or a criticality level of a document may invoke changes to the user profiles of various users and to the document itself to identify the portions of data which have varying levels of criticality.

Organizations change over time, and the personnel in certain areas are promoted or may change jobs during their career within the organization. In a situation in which a person has been promoted from a technician to a manager, his access level would change commensurate with his new position. Documents which he had previously reviewed as a technician at a lower access level than he is currently granted, if left unchanged, could result in a deficit for such information needed for his/her current management position. Therefore, to provide adequate access for a person with a changed access level, FIG. 10 illustrates an example of a method 1000 that includes receiving an updated access level 1010 of a user profile. His/her access level has been updated and therefore the current role requires access to additional critical data. In this example, the updated access would result in replacing an original document, at a lower access level, with an updated document associated with the updated access level. The system will also synchronize 1014 the original document with the updated document so that the updated access level is expressed in the data that may be viewed. The changes to an access level of a user or a criticality level of a document may invoke changes to the user profiles of various users and to the document itself to identify the portions of data which have varying levels of criticality. This process may also work in reverse, in which an employee that has been demoted may receive a reduced access level, such as she would now be unable to review the salaries of fellow technicians that she had access to earlier as their manager.

Figure 11:
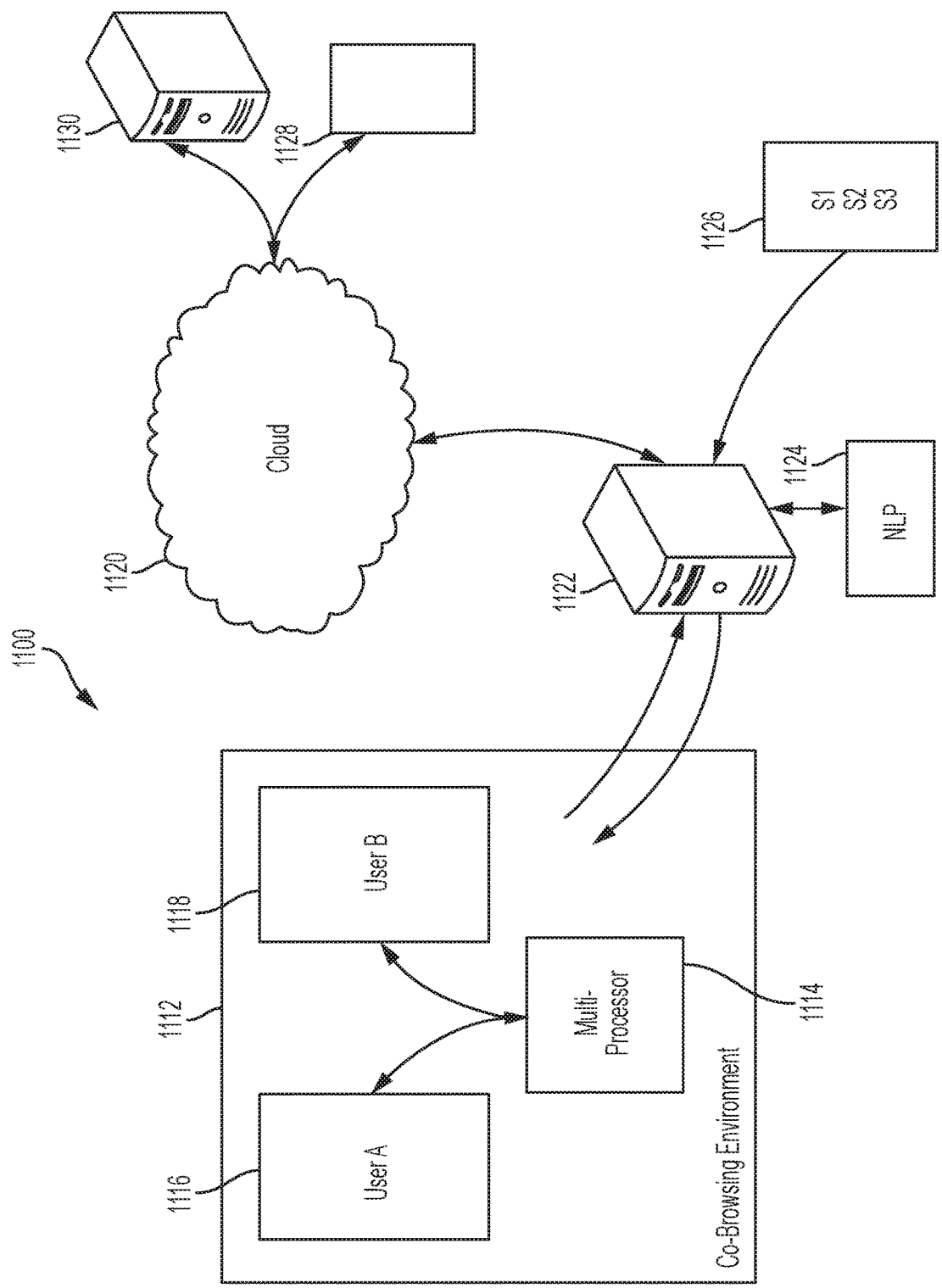
FIG. 11 illustrates a network diagram of a co-browsing session according to an example embodiment of the present application.

FIG. 11 illustrates another system network configuration 1100. Referring to FIG. 11, within a co-browsing environment 1112, there are generally two user devices interacting with a multiprocessor 1114, user device A 1116 and user device B 1118. A web server 1122 is connected to the multiprocessor and receives requests and processes and answers the requests. Resident within the web server is a natural language processing module 1124 which has the capability to review requests, inputs and outputs, and use natural language processing to determine various parameters pertaining to each of the screens presented to user devices A and B. The natural language module 1124 parses the content of the screens sent to the individual users. In this case, the NLP 1124 is resident on the web server 1122 and creates a screen list of each of the items present within the screen that are requested by the user, this screen list is resident on the web server 1122. The screen list is indexed according to a criticality of each of the items within the screen list. The determination of criticality of individual items may be either decided upon by an administrator, or may be parsed by the web server based on an overall criticality list decided upon by the administrator.

A list is created of admissible items, which the user may access, which is referred to as an access list, as illustrated in table 1300. The access list is based on the access level of the user, and the access list is stored in a file on the web server 1122. The comparison of the screen list and the access list permits a capability of filtering content shown to the individual user devices 1126, which would permit filtered screens to be presented to the user. In this example, both the screen list and the access list are stored on the web server, however, the lists may also be stored on the cloud 1120, in a secure server or encrypted on the individual user device. The access list may be based on job requirements, individual access levels, managerial levels or simply an assessed access level. No restrictions have been placed on the structure in which each of the lists are stored, they may be individual lists, tables, databases, or the data may be coalesced into a relational data system. The web server utilizes the information provided by the natural language module and the access level file to determine what may be provided to the individual users. The web server is also connected to a cloud 1120 which may contain in part data accessed by the user devices. Secured data is held in a secure server 1130 and a secure file 1128.

Figure 12:
FIG. 12 illustrates a table of data criticality according to an example embodiment of the present application.

FIG. 12 illustrates an example of the screen list 1200. Each item in a downloaded page is reviewed by the NLP and assessed as to screen item, screen item type and screen item assessed criticality. In this example, Joe Smith is the screen item, which is assessed by the NLP which determines that the name 'Joe Smith' is an employee name and has an assessed criticality of 1 based on an employee user profile. In the downloaded page is the word "Engineer", which is assessed by the NLP as being a profession having a defined criticality of 2 in that organization. Within the downloaded page is the word "Supervisor" which is assessed by the NLP as a management position, and the system assesses the criticality as being '2'. The words "Ubiquitous Computing" and "$30B TAM" are also parsed by the NLP and assessed for criticality by the system based on known words and aliases defined in a word list.

Figure 13:
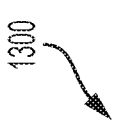
FIG. 13 illustrates another table of data criticality according to an example embodiment of the present application.

FIG. 13 illustrates an access list linked to the screen list, in the access list the screen type and assessed criticality are reviewed with respect to the user profile. In this case 'Clive Barker', has a management level of 2 and is reviewed. In this example, 'Mr. Barker' is able to review items having a criticality of 2 and below. Those items assessed for admissibility of greater than 2 are obscured for access attempts made by that user's profile.

In another example, user device A 1116, represents a contractor working on a program that reviews financial data of other companies. User A's access level, due to the fact that he is a contractor is assessed by the application as a '1'. The access level is stored in an access list file 1126 on the web server 1122. In operation, user A requests a specific page of a program file provided by the secure server 1130 through the cloud 1120 in an encrypted form to the web server 1122. Prior to sending the page to user A, the NLP 1124 stored on the web server, reviews and processes the page and parses the information creating a screen list, which has assessed the criticality of the various portions of the page. The access list and the screen list are compared by the web server 1124 and a page is sent to user A 1116 obscuring those items which exceed the allowance rules of user A's access list.

In another example, user device A 1116 represents a contractor working on a program that reviews financial data of other companies. User A's access level, due to the fact that he is a contractor, is assessed by the application as a '1'. The access level is stored in an access list file 1126 on the web server 1122. In operation, user A requests a specific page of a program file provided by the secure server 1130 through the cloud 1120 in an encrypted form to the web server 1122. Prior to sending the page to user A, the NLP 1124 stored on the web server, reviews and processes the page and parses the information creating a screen list, which has assessed the criticality of the various portions of the page. The access list and the screen list are compared by the web server 1124 and a page is sent to user A 1116, obscuring those items which exceed the allowance rules of user A's access list. The criticality may be determined in part based on whether the information is financially critical, such as a social security number, credit card number, pin, and the like, where the information is captured in a specified number of digits. The criticality in this situation would be based on a text analysis which indicates text above or below the number set which indicates financially sensitive information. This critical financial information would be tagged as critical information for blacking-out. Additionally, engineering criticality as determined by a manager, may be based on text matching, and in cases where the text containing the critical engineering detail is encountered, an entire paragraph containing the critical text may be tagged as engineering critical and blacked-out.

Referring to FIG. 7, the natural language processing NLP module parses the document at various levels of granularity. If the entire document has a criticality level greater than the access level of the user, then the entire document is obscured. If a chapter within the document has a criticality level greater than the access level of the user, then the chapter is obscured. This type of granulation of the document occurs according to a sectioning process performed to the document. In another example, a less critical version of the obscured data may be processed based on the access level of the user (i.e., a lower level synopsis of the data). The lower level synopsis data would be called a partially obscured list, as shown in table 1400 of FIG. 14.

In one example, if a user does not have the access rights to view a particular text/image or other portion of a document, such as individual company names, a corresponding result may state "companies within the telecommunications space" for the lowest level access, or another result may include "companies within the Low Earth Orbit (LEO) satellite telecommunications space" for a person with a higher level of access that still does not have sufficient access. In summary, progressive levels of release are permitted based on access level and may offer information that varying levels of information details. In this example, the access list, the screen list and the partially obscured list would be stored on the web server.

Figure 14:
FIG. 14 illustrates a table of data obscuration according to an example embodiment of the present application.
Figure 15:
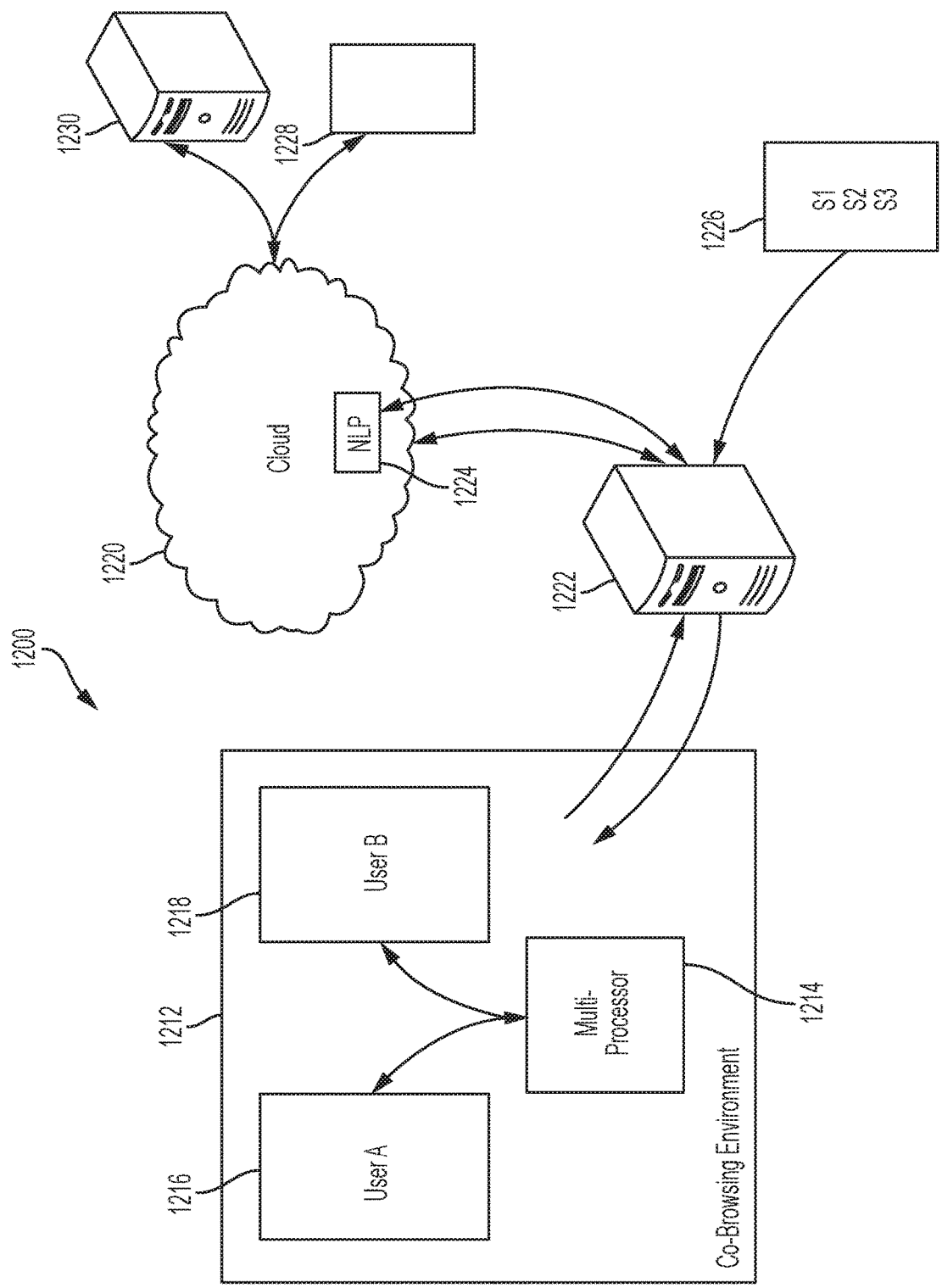
FIG. 15 illustrates another network diagram of a co-browsing session with natural language processing according to an example embodiment of the present application.
Figure 16:
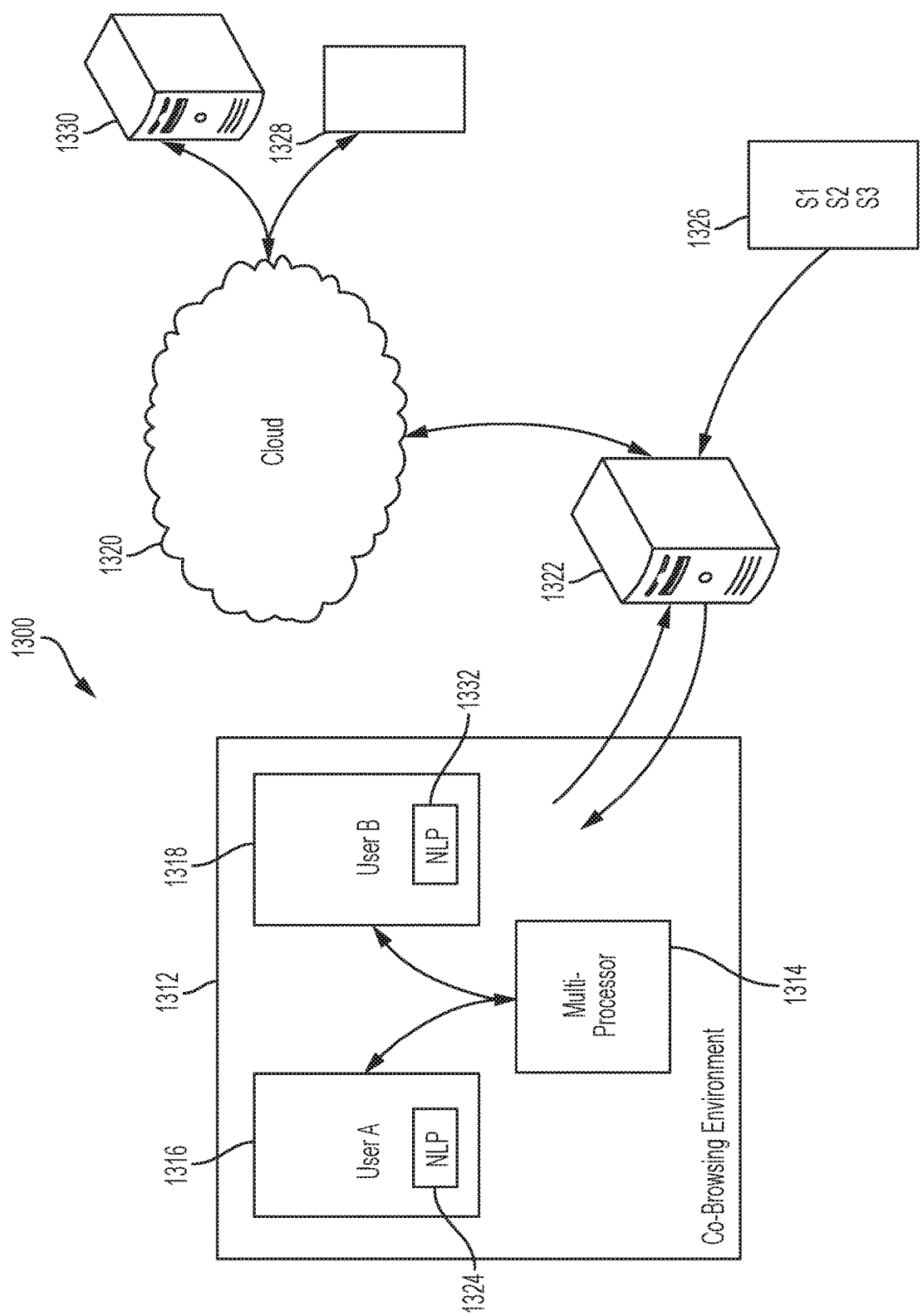
FIG. 16 illustrates a network diagram of a co-browsing session with natural language processing in the user devices according to an example embodiment of the present application.

In FIG. 14, the linked access list of table 1400 is modified to permit multiple levels of obscuration. In this example, the levels of obscuring are not just black and white, on and off, but may also include varying shades of partial obscuration, such as graying the screen item in which the item can be turned on and off, but may also provide a partial level of obscuration. In the table 1400 user 'Clive Barker' has a management level of 2, and when reviewing the project type, since it is one level above Mr. Barker's criticality, instead of completely obscuring the screen item, the data is processed and replaced with the replacement phrase "computing related".

In FIG. 10, a flow diagram is illustrated for updating on a permanent basis the access level of a user, to demonstrate an updated document, which is accessible by a user having that access level. However, instead of permanently modifying the access list, it may be necessary to temporarily modify the list for a reader who has an access right to view such data. In this case, a temp access file would be created which has an updated access level and a time limit for the updated access level. In one example, a senior programmer may be away or has been diverted to another project, in such a case it may be necessary to increase the access level of a contractor or junior employee until the senior programmer returns. The temporary access list in this case would also be stored at the web server 1122 and in this case the system would check both the access list and the temporary access list to set the filtering discussed above.

The NLP may be expanded to include objects such as visual objects that are tied to the NLP word list. As an example, during review of a specific component when a component is considered secret, each element of a photo or a video is defined and treated as an object that may be obscured.

FIG. 12 depicts another example network system layout 1200. Within a co-browsing environment 1212 there are two user devices interacting with a multiprocessor 1214, user device A 1216 and user device B 1218. A web server 1222 is connected to the multiprocessor and receives requests and answers the requests, the web server is communicating with a cloud 1220. Resident within the cloud is a natural language processing module 1224 which has the capability to review requests, inputs and outputs and using natural language processing may determine various parameters pertaining to each of the screens presented to user device A and user device B. The natural language module has the capability of filtering the screens shown to the various users. The web server is also linked to a file which contains at least the access level of the various users 1226. The cloud utilizes the information provided by the natural language module and the access level file provided to the cloud through the web server to determine what may be shown to the individual users. The cloud 1220 may contain, in part, data accessed by the users, where secured data is held in secure server 1230 and secure file 1228. In this example, it would be possible to offer the NLP processing as a service for co-browsing from the cloud, the administrator would set up access lists and criticality lists to a central service which would handle all of the processing and screening. In this example, it would be possible to offload the processing to a data server farm.

FIG. 13 depicts a third example system network configuration 1300. Referring to FIG. 13, within a co-browsing environment 1312 there are two user devices interacting with a multiprocessor 1314, user device A 1316 and user device B 1318. A web server 1322 is connected to the multiprocessor and receives requests and answers the requests, the web server is communicating with a cloud 1320 and to an access file 1326 containing information related to the access level of the individual users. The cloud 1320 may contain in part data accessed by the users, where secured data is held in secure server 1330 and secure file 1328. In this example the natural language modules 1324 and 1332 are resident within the end user devices 1316 and 1318. In this example the end user devices receives access level data from an access level data file 1326 of the individual user and based on local processing of the inputs and outputs to the end user device utilizes natural language modules to assess and mask portions of received data that are beyond an access level of a user profile associated with the user devices. In this example, the NLP functions are offloaded to the user level. In order to address security concerns it would be necessary to encrypt each screen as they are identified and obscure if necessary the portions not permitted to be accessed according to the access level of the user profile.

Figure 17:
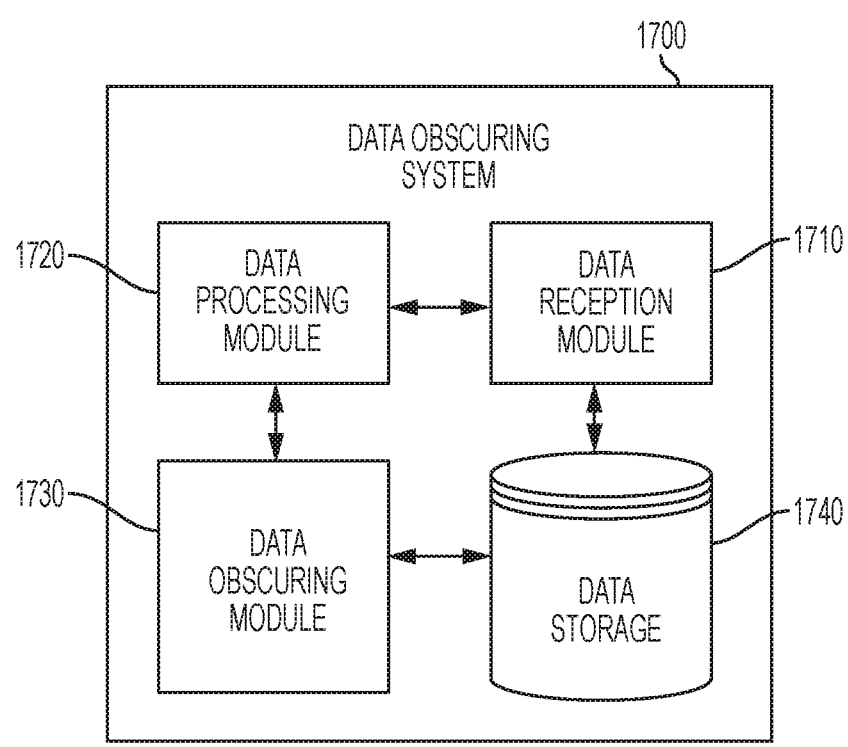
FIG. 17 illustrates a system configuration configured to perform one or more of the example embodiments of the present application.

FIG. 17 illustrates a data obscuring management system 1700 according to example embodiments. Referring to FIG. 17, the system 1700 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 17, the data reception module 1710 may be a transmitter/receiver that receives updates to the data and stores the code in memory 1740 and forwards the data for processing to a data processing module 1720. The updated data may be identified and stored in memory via the data update module 1730.

An example embodiment may include a method that includes identifying data being accessed by at least one user device via the data reception module 1710, retrieving a user profile associated with the user device from the memory 1740, identifying access rights associated with the user profile via the data processing module 1720, and modifying the data by obscuring at least a portion of the data based on the access rights of the user profile via the data update module 1730. The method may also include obscuring at least a portion of the data which includes at least one of blackening, whiting-out, pixelating and covering the at least a portion of the data. The method may also include identifying varying levels of criticality within the data, and obscuring the at least a portion of the data which has an elevated level of criticality when the access rights of the user profile are limited to a level less than the elevated level of criticality.

The method may further provide identifying at least one tag included in the data, wherein the tag identifies the elevated level of criticality, and obscuring the data associated with the tag. The method may further provide synchronizing the obscured portions of data, and displaying the data and obscured portions of data on a user display. Synchronizing the obscured portions of the data may include identifying a plurality of sub-portion surface areas of a document associated with the data and visually obscuring only the sub-portion surface areas. The method may also include identifying updated access rights to the user profile, and the updated access rights comprise at least one modification to the access rights. The method may also provide creating a new document comprising modifications to the data based on the updated access rights.

Another example embodiment may include a method that provides identifying a user profile associated with a user device, identifying a modification to at least one previous access right associated with the user profile, modifying at least one visually obscured portion of a document based on the modification to the at least one previous access right to create an updated document, and providing the updated document to the user device. The method may also include identifying an elevated level access right in the user profile, and removing previously obscured portions of the document to reveal additional data responsive to identifying the elevated level access right in the user profile. The method may further provide identifying a reduced level access right in the user profile, and obscuring additional portions of the document to obscure additional data responsive to identifying the reduced level access right in the user profile. Modifying the at least one visually obscured portion of the document based on the modification to the at least one previous access right includes creating a new document with the modifications to the at least one visually obscured portion of the document and replacing the original document with the updated document.

The method may also provide transmitting the updated document to the user device, and replacing the document with the updated document. The method may also include modifying at least one visually obscured portion of a document by identifying at least one tag associated with the document, the at least one tag includes coordinate information regarding a position on the document where critical data is located. Modifying the at least one visually obscured portion of a document may include modifying a visual display of data at the location identified via the coordinate information.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 18:
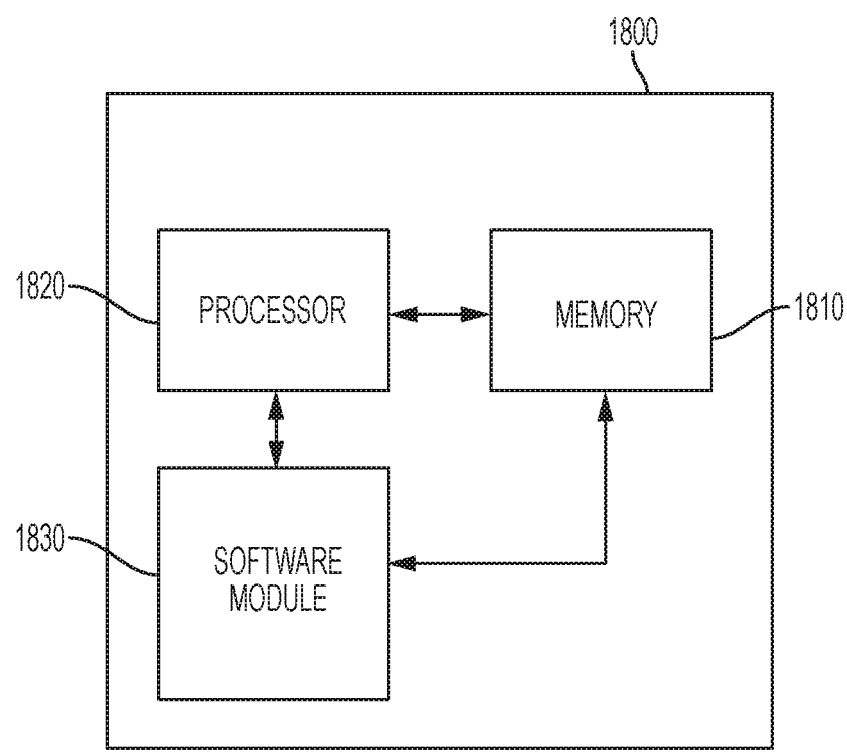
FIG. 18 illustrates an example network entity device configured to store instructions, software, and corresponding hardware for executing the same, according to example embodiments of the present application.

As illustrated in FIG. 18, a memory 1810 and a processor 1820 may be discrete components of the network entity 1800 that are used to execute an application or set of operations. The application may be coded in software in a computer language understood by the processor 1820, and stored in a computer readable medium, such as, the memory 1810. The computer readable medium may be a non-transitory computer readable medium that includes tangible hardware components in addition to software stored in memory. Furthermore, a software module 1830 may be another discrete entity that is part of the network entity 1800, and which contains software instructions that may be executed by the processor 1820. In addition to the above noted components of the network entity 1800, the network entity 1800 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 32 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method comprising:
identifying, via a computer-implemented server, data being accessed by at least one user device, the data having a criticality value representing a minimum level of access right necessary to view an entirety of the data;
retrieving, via the computer-implemented server, a user profile associated with the at least one user device;
identifying, via the computer-implemented server, a level of access rights associated with the user profile;
comparing, via the computer-implemented server, the criticality value to the level of access rights; and
modifying, via the computer-implemented server, the data by obscuring at least a portion of the data based on the level of access rights of the user profile to create a document having a visually obscured portion; and
modifying the visually obscured portion of the document based on a change to the level of access rights to create an updated document, wherein the modifying the visually obscured portion comprises identifying at least one tag contained in critical data hidden in the visually obscured portion, the at least one tag including coordinate information regarding a position on the document where the critical data is located.

2. The method of claim 1, wherein obscuring at least a portion of the data comprises at least one of blackening, whiting-out, pixelating and covering the at least a portion of the data.

3. The method of claim 1, further comprising:
identifying varying levels of criticality within the data; and
obscuring the at least a portion of the data which has an elevated level of criticality when the level of access rights of the user profile are limited to a level less than the elevated level of criticality.

4. The method of claim 3, further comprising:
identifying at least one tag included in the data, wherein the tag identifies the elevated level of criticality; and
obscuring the data associated with the tag.

5. The method of claim 1, further comprising:
synchronizing the obscured portions of data; and
displaying the data and obscured portions of data on a user display.

6. The method of claim 5, wherein synchronizing the obscured portions of the data comprises identifying a plurality of sub-portion surface areas of a document associated with the data and visually obscuring only the sub-portion surface areas.

7. The method of claim 1, further comprising:
identifying an updated level of access rights to the user profile, wherein the updated access rights comprise at least one modification to the access rights; and
creating a new document comprising modifications to the data based on the updated level of access rights.

8. An apparatus comprising:
a processor configured to:
identify data being accessed by at least one user device, the data having a criticality value representing a minimum level of access right necessary to view an entirety of the data;
retrieve a user profile associated with the at least one user device;
identify a level of access rights associated with the user profile;

compare the criticality value to the level of access rights; and modify the data by obscuring at least a portion of the data based on the access rights of the user profile to create a document having a visually obscured portion; and modify the visually obscured portion of the document based on a change to the level of access rights to create an updated document, wherein the modifying the visually obscured portion comprises identifying at least one tag contained in critical data hidden in the visually obscured portion, the at least one tag including coordinate information regarding a position on the document where the critical data is located.

9. The apparatus of claim 8, wherein the obscuring at least a portion of the data comprises being further configured to perform at least one of blacken, white-out, pixelate and cover the at least a portion of the data.

10. The apparatus of claim 8, wherein the processor is further configured to:

identify varying levels of criticality within the data, and obscure the at least a portion of the data which has an elevated level of criticality when the level of access rights of the user profile are limited to a level less than the elevated level of criticality.

11. The apparatus of claim 10, wherein the processor is further configured to identify at least one tag included in the data, wherein the tag identifies the elevated level of criticality, and obscure the data associated with the tag.

12. The apparatus of claim 8, wherein the processor is further configured to:

synchronize the obscured portions of data, and display the data and obscured portions of data on a user display.

13. The apparatus of claim 12, wherein to synchronize the obscured portions of the data comprises the processor being further configured to identify a plurality of sub-portion surface areas of a document associated with the data and visually obscure only the sub-portion surface areas.

14. The apparatus of claim 8, wherein the processor is further configured to identify an updated level of access rights to the user profile, wherein the updated access rights comprise at least one modification to the access rights, and create a new document comprising modifications to the data based on the updated level of access rights.

15. A non-transitory computer readable storage medium configured to store at least one instruction that when executed by a processor causes the processor to perform:

identifying, via a computer-implemented server, data being accessed by at least one user device, the data having a criticality value representing a minimum level of access right necessary to view an entirety of the data;

retrieving, via the computer-implemented server, a user profile associated with the at least one user device;

identifying, via the computer-implemented server, a level of access rights associated with the user profile;

comparing, via the computer-implemented server, the criticality value to the level of access rights;

modifying, via the computer-implemented server, the data by obscuring at least a portion of the data based on the level of access rights of the user profile to create a document having a visually obscured portion; and modifying the visually obscured portion of the document based on a change to the level of access rights to create an updated document, wherein the modifying the visually obscured portion comprises identifying at least one tag contained in critical data hidden in the visually obscured portion, the at least one tag including coordinate information regarding a position on the document where the critical data is located.

16. The non-transitory computer readable storage medium of claim 15, wherein obscuring at least a portion of the data comprises at least one of blackening, whiting-out, pixelating and covering the at least a portion of the data.

17. The non-transitory computer readable storage medium of claim 15, further configured to store at least one instruction that when executed by the processor causes the processor to perform:

identifying varying levels of criticality within the data, and obscuring the at least a portion of the data which has an elevated level of criticality when the level of access rights of the user profile are limited to a level less than the elevated level of criticality.

18. The non-transitory computer readable storage medium of claim 17, further configured to store at least one instruction that when executed by the processor causes the processor to perform:

identifying at least one tag included in the data, wherein the tag identifies the elevated level of criticality; and obscuring the data associated with the tag.

19. The non-transitory computer readable storage medium of claim 15, further configured to store at least one instruction that when executed by the processor causes the processor to perform:

synchronizing the obscured portions of data; and displaying the data and obscured portions of data on a user display.

20. The non-transitory computer readable storage medium of claim 19, wherein synchronizing the obscured portions of the data comprises identifying a plurality of sub-portion surface areas of a document associated with the data and visually obscuring only the sub-portion surface areas, and wherein the non-transitory computer readable storage medium is further configured to store at least one instruction that when executed by the processor causes the processor to perform:

identifying an updated level of access rights to the user profile, wherein the updated access rights comprise at least one modification to the access rights, and creating a new document comprising modifications to the data based on the updated level of access rights.

* * * * *